United States Patent Office

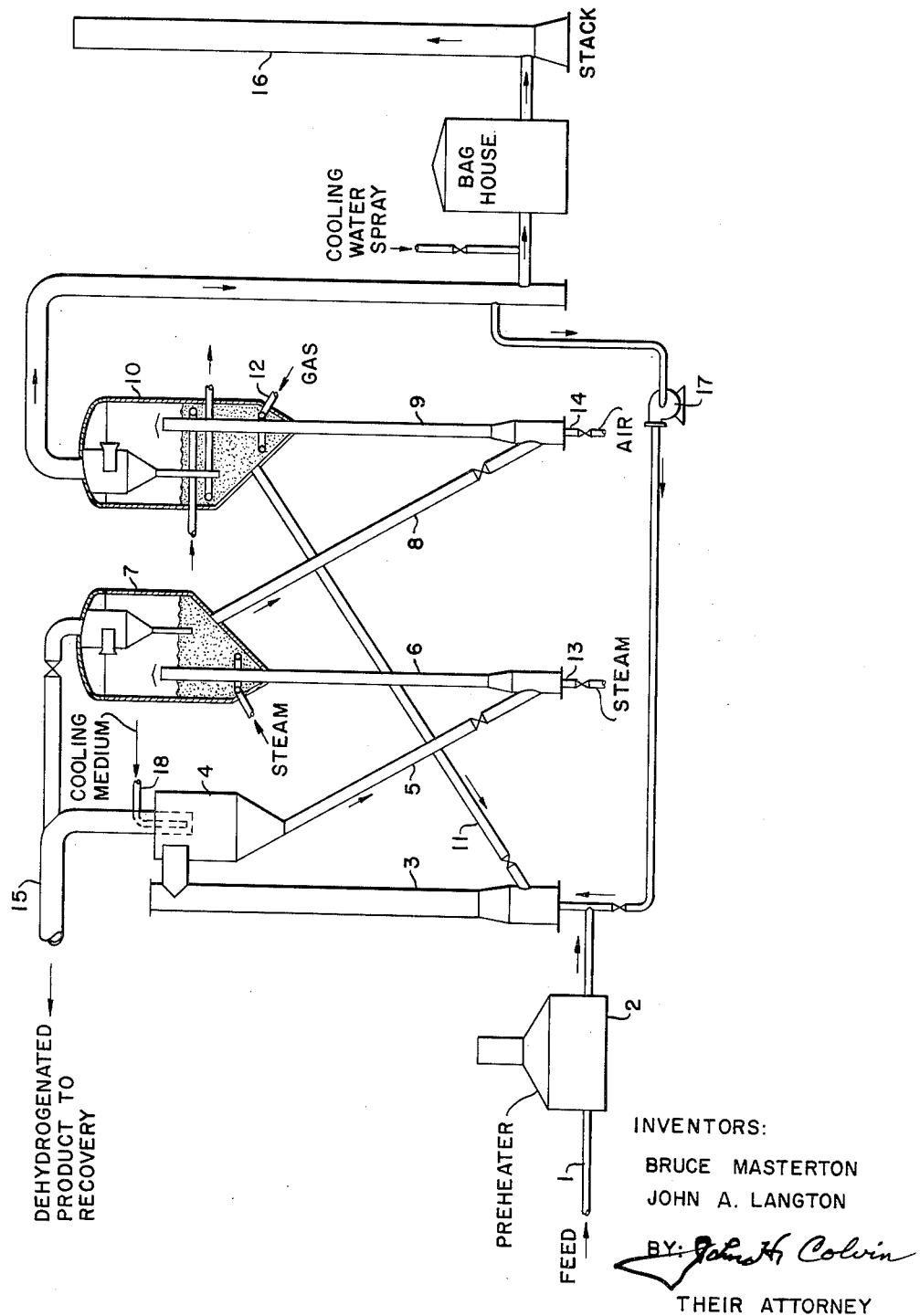

3,050,572
Patented Aug. 21, 1962

3,050,572
DEHYDROGENATION PROCESS
Bruce Masterton, Rolling Hills, and John A. Langton, Redondo Beach, Calif., assignors to Shell Oil Company, a corporation of Delaware
Filed Dec. 29, 1959, Ser. No. 862,607
9 Claims. (Cl. 260—680)

This invention relates to a process for the dehydrogenation of olefins and/or certain other related materials to the corresponding diolefins and vinyl aromatic-like materials. It relates particularly to the oxidative dehydrogenation of monoolefins having at least four contiguous non-quaternary carbon atoms to the corresponding diolefin using iron oxide as an oxidant.

BACKGROUND

The method commercially used for the dehydrogenation of olefins to diolefins is catalytic dehydrogenation. In this method any one of a number of known dehydrogenation catalysts can be used. Those most used consist essentially of chromium oxide supported on alumina, iron oxide promoted with potassium carbonate, and nickel calcium phosphate. These catalysts require the use of relatively high temperatures. Generally the dehydrogenation temperature is about 1100° F. or above. The thermodynamic equilibrium conversion of olefin to diolefin and hydrogen is not very favorable. Consequently it is the practice to operate under conditions where the conversion is limited to a low value, e.g., 20–30%. For this reason and also to avoid excessive side reactions at the high temperatures used, quite short contact times of the olefin with the catalyst are employed, e.g., 1–2 seconds. For example, in the catalytic dehydrogenation of normal butylenes to butadiene using the commercial 205 catalyst ($Fe_3O_4 + K_2CO_3 + Cr_2O_3$) the butylene is mixed with superheated steam and the mixture passed through a shallow fixed bed of the catalyst at a temperature of about 1100° F., and after the short contact time the product is quenched; the butadiene and hydrogen are separated and the unreacted butylene is recycled. The process may be carried out continuously or if desired a somewhat higher activity may be maintained if the catalyst is regenerated from time to time, e.g., once a day. The regeneration is effected by discontinuing the olefin feed and continuing the flow of superheated steam. The carbonaceous deposits are removed by the steam-carbon reaction.

While the mentioned fixed-bed operation is the one used commercially, it has been suggested in the patent literature to effect the catalytic dehydrogenation with the catalyst in a finely divided or powder form. In this proposed process the catalyst is cycled through the reaction zone and a separate heater or regeneration zone.

It has also been proposed in the past to employ iron oxide as an oxidant in the partial oxidation of organic compounds, the iron being reduced to a lower oxidation state in the process. Since 3 moles of $Fe_2O_3$ are required to supply 1 atom of oxygen, it is necessary to use large quantities of the iron oxide and to reoxidize it after a brief reaction time. For this reason the circulation of the iron oxide in powder form is advantageous, it has been found that olefins can be oxidatively dehydrogenated to the corresponding diolefin by this method but the reaction is normally quite unselective. At first the oxidant is very active and a high conversion of the olefin results but the products are mostly carbon dioxide, water, and other side reaction products. The conversion starts dropping immediately and in a matter of seconds the oxidant is spent and must be reoxidized.

OBJECTS

The primary object of the invention is to provide an improved method for effecting oxidative dehydrogenation. Another object is to provide an improved method for the oxidative dehydrogenation of olefins to the corresponding diolefins. Specific objects are to provide an improved process for the production of butadiene, isoprene, styrene, and vinyl pyridine and similar conjugated unsaturated materials by oxidative dehydrogenation, using iron oxide as the primary oxidant.

OUTLINE

In general outline, the oxidative dehydrogenation of the present invention is effected by contacting the feed in the vapor phase at a relatively low temperature within a specific range with a solid iron oxide containing oxidant which has been reoxidized and treated in a special manner. The oxidant is used in a finely divided or powdered form and a riser technique is employed.

DRAWING

The invention will be explained and described in more detail with reference to the accompanying drawing, which is essentially a flow diagram in which certain equipment is illustrated diagrammatically. Briefly, the arrangement includes a feed line 1, preheater 2, riser reactor 3, separator 4, standpipe 5, riser 6, hopper 7, standpipe 8, riser oxidizer 9, auxiliary vessel 10, and standpipe 11, with inlets for gas, steam and air 12, 13 and 14, exit for vapors 15 and 16, and compressor 17.

REACTANT

The reactant may be an olefin having at least four contiguous non-quaternary carbon atoms such as butene-1, butene-2, pentene-1, pentene-2, 2-methylbutene-1, 2-methylbutene-2, 3-methylbutene-1, hexene-1, hexene-2, 2-methylpentene-1, methylcyclopentene, etc., or it may be ethylbenzene or one of its higher homologs, or it may be a corresponding compound of pyridine or similar unsaturated starting materials capable of dehydrogenating to conjugated unsaturated products having two less hydrogen atoms.

The olefin or other feed need not be pure but may be or contain a mixture of reactants and may furthermore contain a substantial amount of inert materials. "A substantial amount" as used herein, may be considered as any amount constituting at least around 20% by weight. The preferred feed materials contains a substantial amount of reactant and preferably also a substantial amount of a diluent material which is preferably easily condensible, such as a saturated hydrocarbon, e.g., natural gasoline or a fraction thereof, benzene, toluene, in an amount up to about 80% of the mixture, preferably 50 to 80%.

In the description of the operation illustrated, the feed is a butane-butylene fraction from which the isobutylene has been removed by absorption with sulfuric acid, leaving about 70% of butene-1 and butene-2 and about 30% of normal butane and isobutane.

The feed is vaporized and preheated to approximately the reaction temperature, e.g., 780° F., in a suitable preheater 2 and is then passed to the bottom of riser reactor 3, which consists of a straight vertical vessel of relatively low ratio of diameter to length, e.g., 0.002 to 0.2. In the example illustrated it is about 8 inches in diameter by about 25 feet long. It may have a bend at its upper end allowing direct horizontal discharge into the separator, or the discharge to the separator 4 may be advantageously through a right-angled short-T coupling approximately as illustrated.

Oxidant, treated as later described, is charged continuously to the bottom of reactor 3 by standpipe line 11.

The solid oxidant is at or above the desired reaction temperature. In the example illustrated it is 40° F. above the reaction temperature.

DILUENT

If the feed contains a substantial amount of inert diluent it may not be necessary or desirable to introduce any appreciable amount of any other material to the reaction zone. Otherwise, it is desirable to inject an inert diluent, as mentioned above. A certain amount of air can be used if desired, but it is recommended not to use steam. In the case illustrated, a certain amount of gas from the reoxidation zone is supplied by compressor 17. The amount added may range up to about 5 moles per mole of feed. In the example illustrated, the amount is 0.25 mole per mole of feed.

CONDITIONS

The selection of the conditions in reactor 3 is rather critical. The residence time of the feed vapors in reactor 3 should not be less than about 1 second nor more than about 20 seconds. The preferred range is about 2 to 10 seconds. This residence time is the calculated residence time, assuming the vapors and gases to obey the perfect gas laws and neglecting the change in volume due to the reaction and the volume in the reaction zone actually occupied by the solid oxidant. The reactor volume is measured from the point of contact of the reactant with the oxidant to the entrance in the separator. In the case illustrated the contact time is about 4 seconds.

The residence time of the solid oxidant should be about 1¼ to 3 times that of the feed or about 1½ seconds to 30 seconds. A preferred range is between about 2½ seconds and 15 seconds. In the case illustrated the residence time is about 6 seconds.

The temperature may be from about 600° F. to about 1000° F. The preferred temperature range is from about 700° F. to 900° F.

The superficial linear velocity of the vapors at the reactor inlet should be at least about 6 feet per second and preferably from about 8 feet per second to about 40 feet per second, possible as high as 60 feet per second. In the case illustrated the superficial inlet velocity is about 11 feet per second.

The optimum amount of oxidant in the reaction zone will vary considerably depending upon the density of the particles and the content of available iron oxide. It is furthermore difficult to measure accurately. A suggested range is from about 2% to about 30% of the reactor space occupied by the solid particles. In the case illustrated the solid occupies about 15% of the volume.

The amount of solid oxidant ($Fe_2O_3$) fed to the reactor zone should be at least about 20 pounds per pound of the olefin feed and is generally considerably greater. The optimum amount will vary considerably depending upon the content and availability of the iron oxide and certain other factors. With an oxidant containing about 15% iron oxide weight ratios as high as 1200 (i.e., 180 with respect to iron oxide) have been used. Generally, however, weight ratios of from about 40 to 800 pounds of the solid oxidant material per pound of the olefin feed are recommended. In the case illustrated the ratio is about 225.

The pressure in the reaction zone may be any practical pressure. A practical range is considered to be from about 0.25 to about 5 atmospheres absolute. The results, as far as the reaction is concerned, improve with decreasing pressure and for this reason pressures somewhat under 1 atmosphere are preferred. However, as the cost of operation increases with decreases in pressure a compromise must usually be accepted and pressures somewhat above 1 atmosphere may be most economic. In a preferred operation the reoxidizer (to be later described) is operated at atmospheric pressure or slightly above (to obtain air blower efficiency) and the reaction zone 3 is maintained at a subatmospheric pressure to bring the system in pressure balance without requiring standpipe lines in excess of about 50 feet vertical height. The product vapors in line 15 in the case illustrated are under partial vacuum produced by a barometric condenser or other applicable means for pulling a vacuum whereas the pressure in the upper section of vessel 10 is about 5 p.s.i.g.

OXIDANT

The oxidant charged to reactor 3 is oxidized and treated under special conditions as will be later described. At this point of the description only its general composition and form will be described. This material contains at least a substantial amount of iron oxide which for the purpose of calculation may be conventionally considered as $Fe_2O_3$. It preferably contains at least a major amount, e.g., above 50 to 95%, of iron oxide, or it may consist substantially completely of iron oxide. The remainder may consist of a material acting as a binder, e.g., alumina, silica, ball clay, or the like, or a stabilizer such as an oxide of chromium, molybdenum, tungsten, manganese, nickel, lithium or bismuth. It should be noted that these latter oxides are frequently used as catalysts. In the present process they are not used as catalyst and they do not exert noticeable catalytic action in the process at the recommended temperature range. When used they are used in minor amounts, i.e., less than substantial amounts and because of their ability to stabilize the reactivity of the iron oxide oxidant. The manner in which such stabilization is accomplished is not known. Thus, materials which have been successfully used after proper treatment range from an alumina impregnated with about 15% iron, calculated as $Fe_2O_3$, up to 100% magnetites ($Fe_3O_4$). Neither of these particular materials is, however, the best of the numerous materials tried. The former was found to require high solids to feed ratios which leads to substantial losses by attrition and the latter material is not as active as desired probably due to their physical form affording only a low surface available for reaction. The preferred materials are intermediate of these. One very suitable material consists of 95% iron oxide and 5% alumina, and the best material so far found consists of 90% iron oxide, 5% alumina, and 5% chromium oxide. These latter materials were prepared by mixing iron oxide having an average particle diameter below about 1 micron and having an available surface area of at least 5 square meters per gram (measured by the so-called BET method) with the appropriate amounts of aluminum nitrate, and also chromic oxide in the latter case, and sufficient water to make a dough or paste, drying, calcining at about 1112° F., grinding and sieving.

The inclusion of 5% chromium oxide was found to give a better product than one containing 2% chromium oxide but no additional advantage was noted on increasing the chromium oxide content to 10%.

It should be noted that certain elements are detrimental if present in more than trace amounts. Thus, for example chlorine, sodium and potassium, reduce the effectiveness of the oxidant and their inclusion should be guarded against.

The oxidant is used in the form of a powder which may contain particles ranging from sub-micron size up to about 25 mesh, i.e. about 710 microns. In general, a rather wide range of particle sizes is advantageous. In the particular case illustrated the oxidant consists of 85% $Fe_2O_3$, 10% $Al_2O_3$ and 5% $Cr_2O_3$ and is in the form of a powder ranging from about 25 mesh to 400 mesh (37 microns) with an average particle size of about 300 microns.

In reactor 3 there are theoretically two reactions in particular which normally tend to take place. These are, using butene-2 as an exemplary feed:

(1) $CH_3-CH=CH-CH_3 + 36Fe_2O_3 \rightarrow$
$24Fe_3O_4 + 4H_2O + 4CO_2$ (2) $CH_3-CH=CH-CH_3 + 3Fe_2O_3 \rightarrow$
$CH_2=CH-CH=CH_3 + 2Fe_3O_4 + H_2O$ The latter of these reactions is desired and the first is undesired. Using ordinary $Fe_2O_3$ as a starting material the first reaction predominates. Actually there are some other reactions of ill defined nature which lead to oxygenated products and others that lead to unoxidized or incompletely oxidized tarry deposits. These may be set forth in a very general way as follows:

(3)       $C_nH_{2n}+3Fe_2O_3 \rightarrow C_nH_{2n}O+2Fe_3O_4$
(4)       $C_nH_{2n}+3nFe_2O_3 \rightarrow C_n+nH_2O+2nFe_3O_4$ In the process of the present invention Reaction 2 above is much favored over the others; Reaction 3 is virtually non-existent, and Reaction 4 is minor.

The effluent from the reaction zone 3 is discharged directly into a separating device for separating the vapors from the spent solid oxidant. This separation is preferably made promptly as by a cyclone separator but this is not important unless the conditions in reaction zone 3 are so chosen that the oxidant is not largely deoxidized (spent). In the operation illustrated this separating device is the centrifugal separator 4 illustrated. The vapors are separated from the solids and passed by line 15 to a system for the recovery of the desired diolefin or equivalent product. This latter system is not illustrated because it is conventional and forms no part of the present invention.

The temperature in the reaction zone 3 and separator 4 are normally considerably below those likely to cause appreciable side reactions in the product. As a safety precaution a small amount of water or other medium may, however, be injected to somewhat cool the reaction product if desired. Means for this are indicated in the drawing under the legend "cooling medium."

STRIPPING

The spent or substantially spent solid oxidant separated in separator 4 flows by gravity through standpipe 5 to near the bottom of a riser line 6 to which steam is introduced by line 13. The main purpose of this steam or other inert gas is to displace the vapors of reaction product and unreacted feed from the interstitial spaces between the particles of the spent oxidant and thus to allow their recovery. The steam introduced by line 13 carries the spent solid oxidant in suspension up through the riser line 6 and is then immediately separated from the solid. The vapors may be passed to a separate recovery system but are advantageously passed to the main product line 15 as shown.

The partially spent oxidant separated from the steam is collected in vessel 7 as a fluidized bed. Additional steam is desirably passed up through the bed by the line shown. The contact of the spent oxidant with a predominantly steam atmosphere in this fluidized bed effects further stripping of minor amounts of occluded product. The total amount of steam applied to vessel 7 is from about 1 to 20 pounds per 1000 pounds of the solid. While this particular method of contacting the partially spent oxidant is not essential it is preferred. It is useful however to contact the spent oxidant with a predominantly steam atmosphere for at least several seconds, e.g. 5 seconds, before further processing of the circulated oxidant. In the case illustrated 3 pounds of steam are used in the riser and 2.5 pounds in the fluidized bed.

REOXIDATION

The steamed spend oxidant is passed from vessel 7 by a standpipe 8 to near the bottom of a riser type reoxidizer 9. Air is introduced into the bottom of this reoxidizer by line 14 and carries the solid as a suspension up through the oxidizing zone. As noted above, the oxidizing zone is operated at a pressure preferably around atmospheric or not greatly above, e.g. 20 p.s.i.g. The inlet linear velocity and concentration of solid etc. are approximately in the same ranges as in reactor 3.

The solid issuing from the top of the riser oxidizer 9 still contains most of its carbonaceous deposits and is not a good material for reuse. This material is collected as a fluidized bed in vessel 10 while the gases are withdrawn by the line shown to a baghouse and hence to the stack. A part may be withdrawn to the blower 17 as shown and passed to the reactor 3. In order to protect the bags in the baghouse the gases may be suitably cooled by any known method, e.g. by application of a spray of cooling water as illustrated.

The oxidized oxidant issuing from the riser oxidizer 9 is separated by gravity or centrifugal force from the gases and is collected in a fluid bed in vessel 10 where in view of the relative sizes and relative densities its residence time is several fold that in the riser 9, e.g. at least three-fold.

The handling of the oxide at this point is important. The oxidant issuing from the riser has its surface essentially oxidized to $Fe_2O_3$ and still contains most of its carbonaceous deposits (which are however quite small percentage wise). In the fluid bed these carbonaceous deposits are removed to a large extent but not completely through oxidation by the iron oxide. If the material is simply collected in vessel 10 and removed after a period of time it is found that it has lost reactive capacity. This is due to the oxidized iron being reduced again in oxidizing the remaining carbonaceous deposits. If on the other hand a large amount of air is injected into the fluid bed to burn off the carbonaceous deposits all of the iron is oxidized to $Fe_2O_3$ and additional oxygen is apparently chemisorbed which later results in excessive destruction of feed. The conditions in vessel 10 are therefore adjusted between these extremes. It is important that the temperature be retained low, i.e. above the reaction temperature in the reaction zone 3 but not above about 1025° F. and it is desirable to inject a small amount of free oxygen but the amount injected should be limited so that the gas in the bed contains a very low partial pressure of free oxygen. It is found that the amount of air (or equivalent oxygen) required should be such that the total air (including that used in the riser) amounts to from about 20 to 40 s.c.f. per pound of the olefin feed. Under these conditions the concentration of oxygen in the offgas is generally nil, e.g. 0 to 1%. The ratio of $Fe_2O_3$ to $Fe_3O_4$ is high but there is retained some $Fe_3O_4$ and carbon. Also the $Fe_2O_3$ is retained largely in the cubic or gamma form which affords the most selective reaction. If the spend oxidant is transferred to the reoxidizing zone by other means and all of the air is supplied to the fluidized bed the same total amount of air is used.

The control of the temperature, i.e. removal of the overall exothermic heat of the sum of reactions, is preferably effected by cooling coils as illustrated but can be accomplished by other suitable means. The gas containing free oxygen, e.g. air diluted with flue gas, is injected by line 12.

The now reoxidized and conditioned oxidant is withdrawn by standpipe 11 and passed through the reactor 3 as aforesaid thus completing the cycle.

PRECONDITIONING

In general there is some loss of oxidant due to attrition. Such loss is made up by replenishment. Also in some cases the oxidant slowly loses its reactivity and it is then desirable to withdraw some and replace it with fresh material. This loss of reactivity is believed to be due to some extent to a gradual decrease in surface area and in part to conversion of the $Fe_2O_3$ from the gamma form to the more stable and less reactive alpha form. The fresh material used for replenishment may be prepared as described above and charged to the unit provided that the amount charged is a small part of the total inventory. This is so because in passing through reaction and conditioning cycles a number of times it gradually becomes conditioned. If the material to be added is a substantial part of the inventory it is desirable to precondition it prior to charging to the unit. The fresh material prepared, for example, as indicated above may be preconditions as follows: it is first heated to about 1000° F. and reduced with a hydrocarbon or hydrogen. An amount of olefin equal to about 1 pound per 10 pounds of the iron oxide is suitable for the reduction. The temperature is then reduced to the desired operating temperature and the material is oxidized with air at that temperature. It should be noted that the oxidation of magnetite at temperatures above 1025° F. results in alpha $Fe_2O_3$ and not gamma $Fe_2O_3$.

*Examples*

The results shown in the following Table II illustrate those that can be obtained. They were obtained in a pilot plant in which the riser reactor was 1″ in diameter and 45′ long. This riser reactor discharged into a vessel 6″ in diameter through cyclone separators. The oxidant was passed to a steam stripper and then passed to a vertical riser oxidation zone 1½″ in diameter by 38′ long. The oxidant was then collected in a vessel wherein it was maintained as a fluidized bed from which it was returned to the riser reactor. The feed had the following composition:

TABLE I

| Compound: | Mole percent |
|---|---|
| Propane | 0.1 |
| Isobutane | 0.9 |
| n-Butane | 18.8 |
| n-Butylene | 77.9 |
| Isobutylene | 1.4 |
| 1,3-butadiene | 0.9 |

The oxidant used was an alumina base impregnated with about 15% $Fe_2O_3$ and was in the form of a powder essentially passing a 100 mesh ASTM sieve (150 microns). As prepared and before use the iron oxide was in the red hematite (alpha $Fe_2O_3$) form. Before use it was reduced with butylene and then reoxidized with air at a temperature below 1025° F. By this treatment the iron oxide was converted to the ferromagnetic gamma $Fe_2O_3$. The experimental conditions and results are shown in the following Table II.

TABLE II

| Example No | 1 | 2 | 3 | 4 | 5 | 6 |
|---|---|---|---|---|---|---|
| Duration: of test, hr | 10 | 6 | 8 | | | |
| $C_4$ feed rate, lb./hr | 3.5 | 3.5 | 3.5 | 5.0 | 5.0 | 5.0 |
| Diluent ($N_2$) moles/mole olefin | 4 | 4 | 4 | 4 | 4 | 4 |
| Oxidizer air, SCF (70° F.)/hr.: | | | | | | |
| To riser | 55 | 60 | 65 | 40 | 140 | 140 |
| To dense bed | 20 | 25 | 30 | 60 | 60 | 35 |
| Oxidizer temperature, ° F | 895 | 895 | 895 | 925 | 925 | 925 |
| Reactor temperature, ° F | 870 | 870 | 870 | 900 | 900 | 900 |
| Reactor inlet pressure, p.s.i.g | 16 | 16 | 16 | 12 | 14.5 | 14.5 |
| Reactor inlet gas velocity, ft./sec | 11 | 11 | 11 | 10 | 9 | 9 |
| $C_4$ contact time, sec | 4 | 4 | 4 | 4 | 5 | 5 |
| Oxidant rate, lb./hr | 2,450 | 2,450 | 2,450 | 3,220 | 3,340 | 3,340 |
| Oxidant/$C_4$ ratio | 700 | 700 | 700 | 640 | 670 | 670 |
| Carbon on reoxidized oxidant, percent weight | 0.10 | 0.11 | 0.11 | 0.04 | 0.05 | 0.06 |
| Conversion, percent mix | 76 | 78 | 80 | 78 | 84 | 85 |
| Selectivity, percent mix | 78 | 77 | 76 | 71 | 72 | 75 |

The effect of the rate of addition of oxygen to the reoxidizing zone is shown by the following examples in which the same pilot plant and ovidant were used under the following general conditions: temperature 900° F., hydrocarbon feed rate 5 pounds per hour, contact time of hydrocarbon 4.2 seconds, steam to stripper ca. 4 pounds per thousand pounds of oxidant, inert gas to reactor approximately 3 moles per mole of hydrocarbon.

TABLE III

| Oxidant circulation rate, pounds per hour | Air to reoxidizer, SCF/hr. | $O_2$ consumption, percent | Conversion, percent | Selectivity, percent |
|---|---|---|---|---|
| 3,340 | 163 | 100 | 81 | 75 |
| 2,080 | 163 | 98 | 67 | 70 |
| 1,280 | 125 | 96 | 55 | 72 |

It will be noted that in the first example the oxygen consumption was 100% and the conversion was 81% with a selectivity of 75%. Where the oxidant circulation rate was reduced to 2080 while maintaining the same air rate, free oxygen appeared in the off gases from the reoxidizing vessel and the activity dropped to 67% at 70% selectivity. When the circulation of the solid was reduced to 1280 the former air rate would obviously have been excessive and even a reduced air rate of 125 s.c.f./hr. was excessive since only 96% of the oxygen was consumed and the results were correspondingly worse.

We claim as our invention:

1. A process for the oxidative dehydrogenation of butylene to butadiene which comprises passing a vapor stream containing n-butenes in contact in a reaction zone at a tempertaure between 600 and 1000° F. and a contact time between about 1 and 20 seconds with a continuous stream of a powdered oxidant in a weight ratio of butylene to powdered oxidant of from 1:20 to 1:1200 with said powdered oxidant containing as the primary oxidizing agent at least about 15% by weight of iron oxide as $Fe_2O_3$, separating the used and partially reduced iron oxide from the hydrocarbon products, passing the separated iron oxide from said reaction zone to a separate steaming zone and steaming it with between about 1 and 20 pounds of steam per thousand pounds of said partially reduced oxidant, passing the partially reduced oxidant from said steaming zone to a fluidized bed in a separate reoxidation zone, maintaining the temperature of said reoxidation zone above that of the reaction zone but below 1025° F., feeding to said fluidized bed near the bottom a gas containing oxygen in an amount equivalent to from about 20 to 40 standard cubic feet of air per pound of butylene feed, and cycling partially reoxidized oxidant from said bed to said reaction zone.

2. In a process for the oxidative dehydrogenation of an olefin containing from 4 to 6 contiguous non-quaternary carbon atoms to the corresponding diolefin in which a vapor stream containing said olefin is passed in contact in a reaction zone at a temperature between 600 and 1000° F. and a contact time between about 1 and 20 seconds with a continuous stream of a powdered oxidant in the weight ratio of olefin to powdered oxidant of from 1:20 to 1:1200 with said powdered oxidant containing as the primary oxidizing agent a substantial proportion of iron oxide as $Fe_2O_3$ and said powdered oxidant is continuously passed from said reaction zone to a reoxidizing zone wherein it is reoxidized, the improvement which comprises passing the used powdered oxidant from said reaction zone to a separate steaming zone and steaming it with between about 1 and 20 pounds of steam per thousand pounds of said used oxidant, passing the used oxidant from said steaming zone to a reoxidizing zone with air in an amount to afford a superficial inlet gas velocity between about 8 and 40 feet per second at a temperature above that in the reaction zone but below 1025° F., collecting the powdered oxidant in a fluidized bed maintained at said latter temperature, feeding to said fluidized bed near the bottom a gas to maintain the bed in a free-flowing fluidized condition, said last mentioned gas containing oxygen in an amount such that the total oxygen is equivalent to from about 20 to 40 s.c.f. of air per pound of olefin feed, and passing fluidized oxidant from said last mentioned bed to said first mentioned reaction zone.

3. In a process for the oxidative dehydrogenation of an olefin containing from 4 to 6 contiguous non-quaternary carbon atoms to the corresponding diolefin in which a vapor stream containing a substantial proportion of said olefin is passed in contact in a reaction zone at a temperature between 600 and 950° F. and a contact time between 1 and 20 seconds with a continuous stream of a powdered oxidant in a weight ratio of olefin to powdered oxidant of from 1:20 to 1:1200 with said powdered oxidant containing as the primary oxidizing agent a substantial proportion of iron oxide as $Fe_2O_3$ and said powdered oxidant is continuously passed from said reaction zone to a reoxidizing zone wherein it is reoxidized with air at a temperature between about 700 and 1000° F. which temperature is not more than 100° F. above the temperature in said reaction zone, the improvement which comprises passing the spent powdered oxidant from said reaction zone to a separate steaming zone and passing there-through steam in an amount between about 1 and 20 pounds per thousand pounds of said spent oxidant, passing the spent oxidant from said steaming zone to a riser reoxidizing zone, transporting the spent oxidant through said riser reoxidizing zone with air in an amount to afford a superficial inlet gas velocity between about 8 and 40 feet per second with not more than 1% by volume of free oxygen in the exit gas, separating the powdered oxidant from said gas and collecting the former in a fluidized bed maintained at a temperature at least equal to but not more than about 100° F. above the reaction temperature, feeding to said fluidized bed near the bottom a gas to maintain the bed in a free-flowing fluidized condition, said last mentioned gas containing free oxygen in an amount such that the total is equivalent to from about 20 to 40 s.c.f. of air per pound of olefin feed, and passing fluidized oxidant from said last mentioned bed to said first mentioned reaction zone.

4. A process for the oxidative dehydrogenation of an olefin containing from four to six contiguous non-quaternary carbon atoms to the corresponding diolefin which comprises passing a vapor steam containing said olefin in contact in a reaction zone at a temperature between 600 and 1000° F., and a contact time between about 1 and 20 seconds with a stream of powdered oxidant in a weight ratio of olefin to powdered oxidant of from 1:20 to 1:1200 with said powdered oxidant, containing as the primary oxidizing agent at least about 15% by weight of iron oxide as $Fe_2O_3$, separating the used and partially reduced iron oxide from the hydrocarbon products, passing the separated iron oxide from said reaction zone to a separate steaming zone and steaming said iron oxide with between about 1 and 20 pounds of steam per 1000 pounds of said partially reduced oxidant, passing the partially reduced oxidant from said steaming zone to a separate reoxidation zone wherein said oxidant is maintained in a fluidized state, maintaining the temperature of said reoxidation zone above that of the reaction zone but below 1025° F., feeding to said separate reoxidation zone a gas containing oxygen in an amount equivalent to from about 20 to 40 standard cubic feed of air per pound of olefin feed and sufficient to maintain said oxidant in a fluidized state, and cycling partially reoxidized separated oxidant from said reoxidation zone to said reaction zone.

5. The process according to claim 4 in which the said olefin is a normal butene.

6. The process according to claim 4 in which the said olefin is a tertiary amylene.

7. The process according to claim 4 in which the powdered oxidant consists of a major amount of iron oxide, a minor amount of chromium oxide, and a minor amount of a binder.

8. The process according to claim 4 in which the powdered oxidant consists of about 90% iron oxide calculated as $Fe_2O_3$, about 5% chromium oxide calculated as $Cr_2O_3$, and about 5% alumina.

9. The process according to claim 4 in which the ratio of butylene to powdered oxidant is from 1:40 to 1:800.

References Cited in the file of this patent

UNITED STATES PATENTS

| | | |
|---|---|---|
| 2,449,295 | Gutzeit | Sept. 14, 1948 |
| 2,921,105 | Lowman | Jan. 12, 1960 |